United States Patent [19]

Nakamura

[11] Patent Number: 4,637,808
[45] Date of Patent: Jan. 20, 1987

[54] BICYCLE REAR DERAILLEUR
[75] Inventor: Shizuo Nakamura, Kobe, Japan
[73] Assignee: Kawamura Cycle Co., Ltd., Kobe, Japan
[21] Appl. No.: 701,874
[22] Filed: Feb. 15, 1985
[30] Foreign Application Priority Data Feb. 16, 1984 [JP] Japan .................................. 59-28161
Feb. 27, 1984 [JP] Japan ............................. 59-27896[U]

[51] Int. Cl.$^4$ ............................................. F16H 9/24
[52] U.S. Cl. ...................................................... 474/80
[58] Field of Search .................................. 474/78-83, 474/101, 113, 116; 280/261; 180/72

[56] References Cited

U.S. PATENT DOCUMENTS 3,125,894 3/1964 Juy ..................................... 474/80 X
3,583,249 6/1971 Morse ..................................... 474/80

FOREIGN PATENT DOCUMENTS 645791 11/1950 United Kingdom .................. 474/80

*Primary Examiner*—Stephen J. Novosad
*Assistant Examiner*—Thuy M. Bui
*Attorney, Agent, or Firm*—Birch, Stewart, Kolasch & Birch

[57] ABSTRACT

A bicycle rear derailleur including a tensioner frame which rotatably support a guide pulley and a tension pulley, a shifter for shifting the tensioner frame in directions substantially parallel to an axis of a rear wheel hub, the tensioner frame including a tension pulley support arm which is resiliently urged to pivotally move rearwardly of the bicycle, and a compensating mechanism for compensating a sagging in an endless drive chain, which is arranged to stretch out the drive chain rearwardly of the bicycle so that a distance between a geometrical vertical line passing through a center of the tension pulley and a vertical tangential line at a rearmost point of a rearwardly stretched portion of the drive chain is larger than a radius of the guide pulley when the tension pulley support arm takes its rearmost position.

4 Claims, 7 Drawing Figures

BICYCLE REAR DERAILLEUR

BACKGROUND AND SUMMARY OF THE INVENTION

This invention relates to a bicycle rear derailleur, and more particularly to improvements in the rear derailleur for increasing its gear capacity (ability of a rear derailleur to compensate a sagging in an endless drive chain to keep it in tension).

As is well known, a multi-speed type bicycle is equipped with a multiple freewheel, which usually has three to eight different sized sprockets, and a rear derailleur for selectively shifting the drive chain from one sprocket to another sprocket of the multiple freewheel in order to effect a desired speed change. It is also well known that some of the multi-speed type bicycle is equipped with a multiple chainwheel (crank gear) and a front derailleur in addition to the multiple freewheel and the rear derailleur. The multiple chainwheel usually has two to three different sized sprockets, and the front derailleur is used for selectively shifting the drive chain from one sprocket to another sprocket of the chainwheel in order to effect a desired speed change.

In the multi-speed type bicycle equipped with both of the multiple freewheel and the multiple chainwheel, the number of available speed change gear positions is given by the number of the freewheel sprockets multiplied by the number of the chainwheel sprockets. For instance, in such a particular bicycle that is equipped with a multiple freewheel having six different sized sprockets and a multiple chainwheel having two different sized sprockets, the speed change of the bicycle is available at twelve (6×2) stages.

Thus, it is apparent that the bicycle equipped with both of the multiple freewheel and the multiple chainwheel generally has a wide range of speed change.

On the other hand, it is well known that a length of the endless chain for driving a bicycle is constant in whatever speed gear position it may be, while a length of a running course of the chain varies in accordance with a selected speed gear position. Naturally, when the chain is shifted from a larger sprocket to a smaller sprocket, the length of the running course of the chain is reduced, resulting in that the chain has a certain excess in its length, producing a certain number of excess link plates of the chain. Thus, the chain loses its tension to produce an undesirable sagging, which will cause disengagement of the chain from the sprockets. Therefore, it is necessary that the rear derailleur is provided with a tension mechanism so arranged as to compensate the sagging in the chain and always arranged as to compensate keep the chain in proper tension. The maximum sagging in the chain is produced when the chain is in engagement with the smallest freewheel sprocket and the smallest chainwheel sprocket, where the excess chain link plates, which causes the sagging and therefore should be absorbed for giving a tension, is greatest in number.

The ability of the rear derailleur to compensate the sagging of the drive chain to keep it in proper tension is called "gear capacity of a rear derailleur" (hereinafter referred to as "gear capacity"). A degree of the gear capacity is defined as the maximum number of the excess chain link plates which the rear derailleur can compensate to keep the chain in tension, and such number corresponds to a difference between the number of the teeth of the largest sprocket and that of the teeth of the smallest sprocket.

In the bicycle equipped with a combination of the multiple freewheel and the multiple chainwheel, the maximum number of the excess chain link plates corresponds to the sum of a difference between the numbers of the teeth of the largest and the smallest sprockets of the multiple freewheel and that between the numbers of the teeth of the largest and the smallest sprockets of the multiple chainwheel.

For example, in a multi-speed type bicycle equipped with such a multiple freewheel as having a largest sprocket with 34 teeth and a smallest sprocket with 13 teeth and such a multiple chainwheel as having a largest sprocket with 52 teeth and a smallest sprocket with 28 teeth, a gear capacity required in the rear derailleur to be used with this particular multi-speed bicycle is 45T as a result of the following calculation:

$$(34-13)+(52-28)=45T$$

wherein "T" is usually added to indicate that the value is derived from the number of the teeth corresponding to the number of excess chain link plates to be absorbed to keep the chain in proper tension.

The rear derailleur having a large gear capacity is advantageous when utilized for a so-called mountain bike (a bicycle specially designed for off-road cycling—See FIG. 1 of the accompanying drawing). In the mountain bike, a diameter of the largest sprocket of the multiple freewheel must be large enough while a diameter of the smallest sprocket of the chainwheel must be small enough, so that a cyclist can make an easy ascent of a steep slope of a hillside or the like steadily and slowly. On the other hand, a diameter of the smallest sprocket of the freewheel must be small enough while a diameter of the largest sprocket of the chainwheel must be large enough, so that the cyclist can enjoy cycling on a plain or downward road or field at a high speed. Thus, it is necessary that the rear derailleur for use with a mountain bike should have a large gear capacity.

The large gear capacity can be easily obtained by simply extending a length of a tension pulley support arm so as to increase a distance between a guide pulley and a tension pulley of the rear derailleur. However, this simple and easy way has never been employed in the manufacture of the mountain bikes because an increase in the length of the tension pulley support arm causes increase in danger of collision of the tension pulley against rocks or other obstacles on the off-road ground. Further, the downwardly extended tension pulley support arm gives an unattractive appearance to a bicycle.

Thus, the maximum gear capacity of various rear derailleurs now available in the markets is 37T at most. However, such a low degree of the gear capacity is not satisfactory to the mountain bike.

It is, therefore, an object of the present invention to provide an improved rear derailleur which permits a considerable increase in a gear capacity without a downward extension of a tension pulley support arm.

Another object of the invention is to provide an improved rear derailleur which is particularly advantageous when utilized with a mountain bike.

A further object of the invention is to provide an improved mechanism for a large gear capacity which is applicable to various types of existing rear derailleurs.

For the achievement of the above objects, the bicycle rear derailleur according to the invention comprises a tensioner frame for rotatably supporting a guide pulley and a tension pulley, a shifter for shifting the tensioner frame in the directions substantially parallel with respect to an axis of a rear wheel hub, the tensioner frame including a tension pulley support arm which is resiliently urged to pivotally move rearwardly of the bicycle in order to give an adjusted tension to an endless drive chain in cooperation with the tension pulley rotatably supported at a free end of the tension pulley support arm, and a compensating mechanism for compensating a sagging in the endless drive chain which is arranged so as to stretch out the endless drive chain rearwardly of the bicycle so that a distance between a geometrical vertical line passing through a center of the tension pulley and a vertical tangential line at a rearmost point of a rearwardly stretched portion of the endless drive chain is larger than a radius of a guide pulley when the tension pulley support arm takes its rearmost position. In one embodiment of the invention, the aforesaid distance is enlarged by provision of an auxiliary tension pulley. In another embodiment of the invention, the distance in question is enlarged by an enlarged tension pulley whose diameter is larger than that of the guide pulley.

As a result of provision of such specific tension mechanism, an entire length of the running course of the chain which is in engagement with the smallest freewheel sprocket and the smallest chainwheel sprocket is extended thereby to provide a large gear capacity.

DESCRIPTION OF THE PREFERRED EMBODIMENTS

Figure 1:
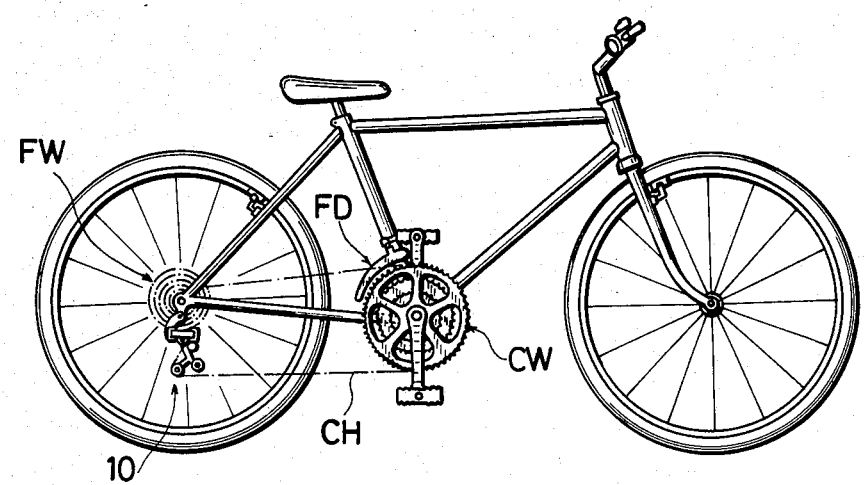
FIG. 1 is a schematic illustration showing a typical example of a mountain bike equipped with a rear derailleur according to the present invention.
Figure 3:
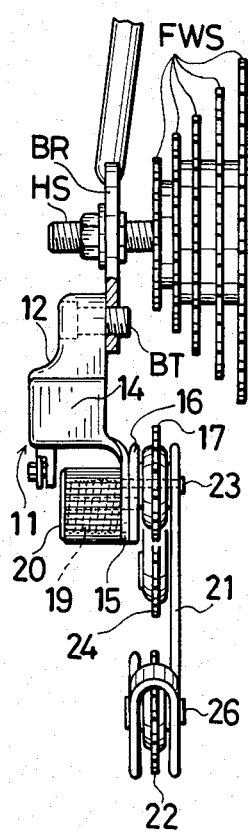
FIG. 3 is a right side elevation taken in the direction of an arrow III of FIG. 2.

Referring first to FIG. 1 of the accompanying drawings, there is illustrated a typical example of a mountain bike equipped with a rear derailleur 10 according to the invention. The mountain bike is further equipped with a known multiple freewheel FW having a plurality of different sized sprockets FWS, a known front derailleur FD, a known multiple chainwheel CW having a plurality of different sized sprockets CWS, and a known endless drive chain CH which is engaged with a selected one of the freewheel sprockets FWS and also with a selected one of the chainwheel sprockets CWS, conventionally. The derailleur 10 of the invention is particularly advantageous when utilized for such mountain bike.

FIGS. 2 to 5 illustrate embodiment of the invention, wherein the rear derailleur 10 of the invention is mounted to a known mounting bracket BR which is secured to a rear wheel hub spindle HS of a bicycle, conventionally.

The derailleur 10 comprises a known deformable parallelogrammic shifter 11 which includes a stationary element 12 to be secured to the mountain bracket BR by means of a bolt BT, a pair of connecting elements 13 pivotally supported at their one side ends by the stationary element 12 so as to extend therefrom in parallel, and a movable element 14 pivotally supported by the other side ends of the pair of connecting element 13.

The pair of connecting elements 13 are forcibly spaced apart by a certain distance by means of springs (not shown), and this distance is resiliently variable in accordance with tension imparted by a known control cable CC which consists of an outer cable OC and an inner cable IC, so that a mounting arm 15, which is rigidly connected to or integral with the movable element 14, can be shifted in the directions substantially parallel with respect to the axis of the rear wheel hub spindle HS.

A tensioner frame for rotatably supporting a guide pulley as well as a tension pulley is carried by the movable element 14 of the shifter 11 so as to be shifted therewith in the directions substantially parallel with respect to the axis of the rear wheel hub spindle HS. The tensioner frame is resiliently urged to pivotally move in one direction in a vertical plane parallel to faces of the freewheel sprockets in order to give an adjusted tension to the endless drive chain.

The basic construction as well as function of the parallelogrammic shifter per se are well known in the art, and several types thereof have been proposed and actually utilized, every one of which is applicable to the rear derailleur of the present invention.

The basic construction as well as function of the tensioner frame per se are also well known in the art, and several types such as a so-called three-point balancing type (disclosed for example in U.S. Pat. No. 3,181,383), a so-called see-saw type (disclosed for example in U.S. Pat. No. 3,364,762), and a so-called pendulum type (disclosed for example in U.S. Pat. No. 3,677,103) have been proposed and actually utilized, every one of which is applicable to the rear derailleur of the present invention.

In the embodiment of FIGS. 2 to 5, the tensioner frame includes a guide pulley support arm 16 which rotatably supports a known guide pulley 17 at its one end and is pivotally supported at its other end by the mounting arm 15 so as to move about a pin 18. The arm 16 is always urged clockwise in FIGS. 2 and 5 by a coil spring 19 housed in a spring case 20 secured to the mounting arm 15 extending from the movable element 14, conventionally.

The tensioner frame further includes a tension pulley support arm 21 which rotatably supports a tension pulley 22 at its one end and is pivotally supported at its other end by the guide pulley support arm 16 so as to move about a pin 23. The arm 21 is also always urged clockwise by a coil spring (not shown). Such arrangement of the arms 16, 21 is also known in the art.

The important feature of the embodiment illustrated in FIGS. 2 to 5 resides in that an auxiliary tension pulley 24 is provided to increase a gear capacity of the derailleur 10.

The auxiliary tension pulley 24 is rotatably supported at a free end of a branch arm 25 extending substantially rearwardly from the tension pulley support arm 21. A length of the branch arm 25 should be so predetermined that a certain distance D, which is at least larger than a radius R of the guide pulley 17, is provided between a geometrical vertical line L1 passing through a center O of the tension pulley 22 and a vertical tangential line L2 at a rearmost point P of a rearwardly stretched portion of the drive chain CH when the tension pulley support arm takes its rearmost position. It should be noted that, in the conventional rear derailleurs, the aforesaid distance D was substantially equal to a radius of a guide pulley.

The branch arm 25 may be rigidly connected at its one end to the tension pulley support arm 21 by welding for example, or may be formed integral with the arm 21. Or otherwise, the branch arm 25 may be detachable to the arm 21 by means of clamp screws (not shown) for example.

The branch arm 25 may extend from any appropriate portion of the arm 21. In the illustrated embodiment, the branch arm 25 extends from a portion between the center of the guide pulley 17 and that of the tension pulley 22.

Further, the branch arm 25 may be pivotally supported at its one end by a pin 26 on which the tension pulley 22 is rotatably supported. In this case, however, the auxiliary tension pulley 25 must be urged clockwise by means of a coil spring (not shown) provided at the pin 26 in the known manner.

If desired, a second auxiliary tension pulley (not shown) may be provided in addition to the above described auxiliary tension pulley 24, and such second auxiliary tension pulley may be rotatably supported by a further branch arm (not shown) extended from the tension pulley support arm 21 or alternatively from the described branch arm 25 in the substantially same manner as described in the foregoing.

Figure 2:
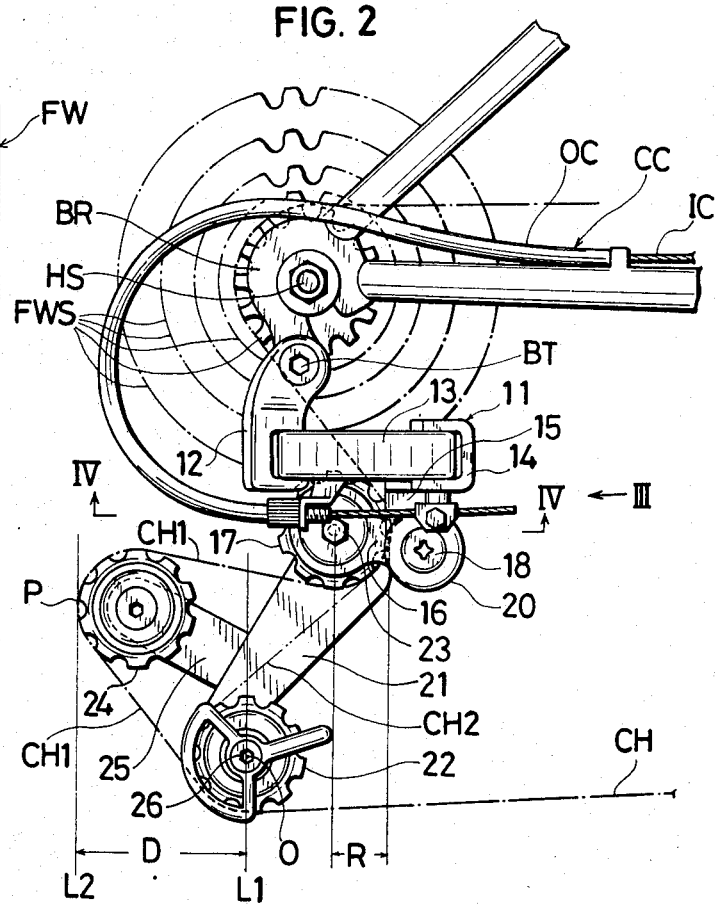
FIG. 2 is a front elevation showing one embodiment of the rear derailleur of the invention, in which the rear derailleur is engaged with a bicycle drive chain on the smallest sprocket of the multiple freewheel.
Figure 4:
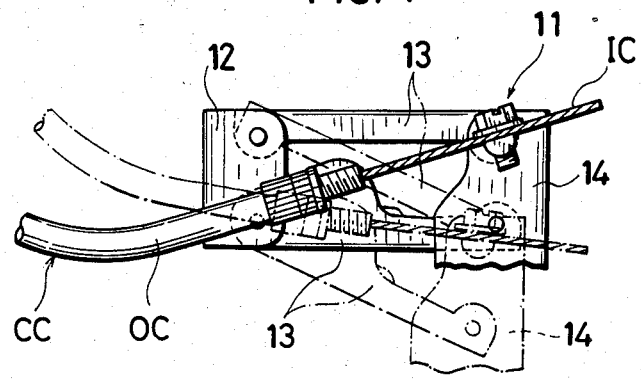
FIG. 4 is an enlarged bottom plan view of a parallelogrammic shifter, taken along the lines IV—IV of FIG. 2.

In operation, a sagging in the endless drive chain CH is basically compensated by positional adjustment of the tension pulley 24. As described in the foregoing, the maximum sagging in the chain is produced when the chain CH is engaged with the smallest freewheel sprocket and the smallest chainwheel sprocket, where the tension pulley 24 takes its rearmost position as illustrated in FIG. 2.

At this phase, the chain CH is in engagement with all of the tension pulley 22, the auxiliary tension pulley 24 and the guide pulley 17, so that the chain CH takes its running course indicated by a one-dot chain line CH1. In this case, if the auxiliary tension pulley 24 does not exist, the chain CH will take its running course indicated by a two-dot chain line CH2 in FIG. 2. Thus, it is clear that the provision of the auxiliary tension pulley 24 according to the invention contributes to extension of the length of the running course of the chain CH and therefore to increase of a gear capacity of the rear derailleur. It has been proved that a gear capacity of 45T or more can be easily provided according to the invention.

Figure 5:
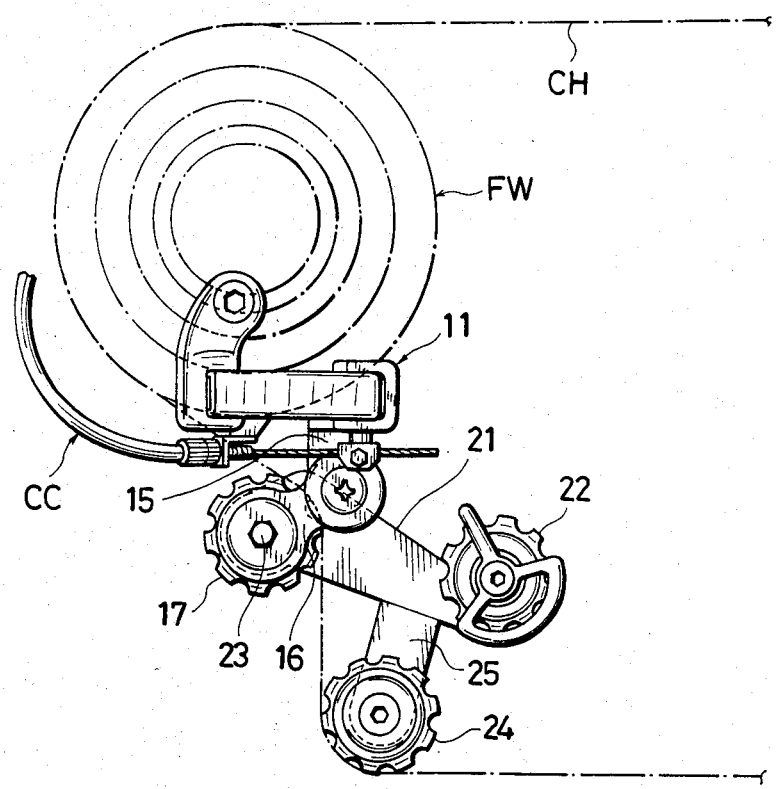
FIG. 5 is a similar view to FIG. 2, but the rear derailleur is illustrated as being in engagement with the drive chain on the largest sprocket of the multiple freewheel.

When the chain CH is in engagement with the largest freewheel sprocket and the largest chainwheel sprocket, the tension pulley 24 takes its foremost position as illustrated in FIG. 5. At this phase, the chain CH is in engagement with the auxiliary tension pulley 24 and the guide pulley 17 but not in engagement with the tension pulley 22.

Figure 6:
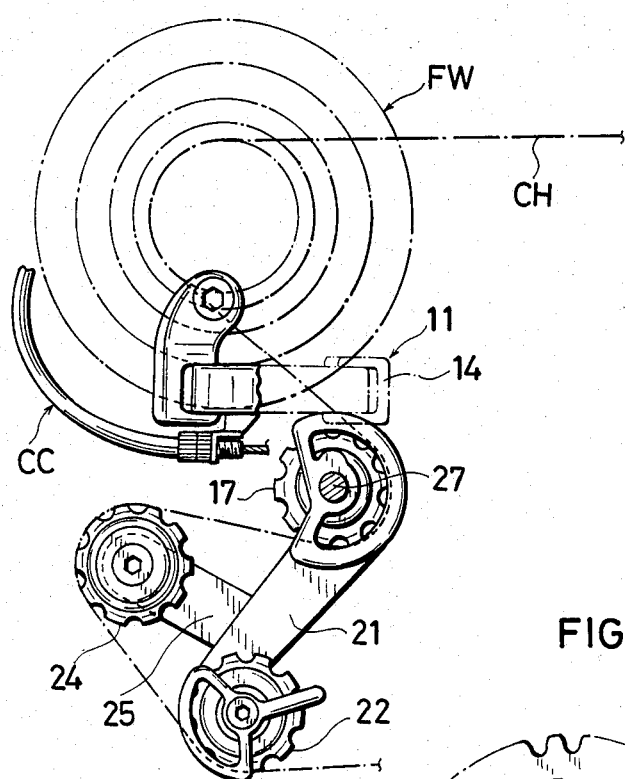
FIG. 6 is a front elevation showing a modification of the invention.

FIG. 6 illustrates a modification of the tensioner frame of the rear derailleur of the invention, wherein the guide pulley 17 is rotatably supported by a pin 27 supported by a mounting arm which does not appear in FIG. 6 but is rigidly secured to the movable element 14 of the shifter 11 in the substantially same manner as described and illustrated with respect to the mounting arm 15 of the embodiment of FIGS. 2 to 5.

The tension pulley support arm 21 is pivotally supported at its one end by the mounting arm so as to move about the pin 27. The tension pulley 22 is rotatably supported at a free end of the tension pulley support arm 21, while the auxiliary tension pulley 24 is rotatably supported by the branch arm 25 extended from the arm 21 in the substantially same manner as described in the foregoing.

The operation of the derailleur of FIG. 6 is substantially the same as that of the derailleur of FIGS. 2 to 5.

Figure 7:
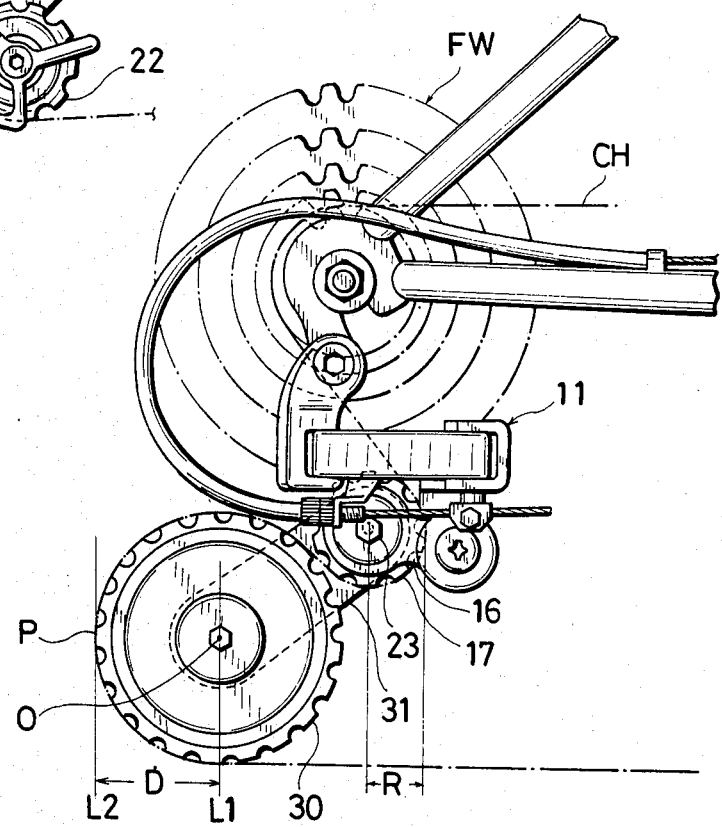
FIG. 7 is a front elevation showing another embodiment of the invention.

FIG. 7 illustrates another embodiment of the invention, wherein the afore-described tension pulley 22 and auxiliary tension pulley 24 are merged into a single, large diameter tension pulley 30 which is rotatably supported at a free end of a support arm 31. The arm 31 is pivotally supported at its other end by the guide pulley support arm 16 so as to move about the pin 23 and is always urged clockwise by a coil spring (not shown), in the substantially same manner as described and illustrated in the foregoing with respect to the embodiment of FIGS. 2 to 5.

Also in this embodiment of FIG. 7, the distance D between the geometrical vertical line L1 passing through the center O of the tension pulley 30 and the vertical tangential line L2 at the rearmost point P of the rearwardly stretched portion of the drive chain CH is enlarged to provide an increased gear capacity of the rear derailleur.

The operation of the rear derailleur of FIG. 7 is also substantially the same as that of the rear derailleurs of FIGS. 2 to 6 as described and illustrated in the foregoing.

The invention being thus described, it will be obvious that the same may be varied in many ways. For instance, the parallelogrammic shifter may be replaced by any other type shifter, e.g. such a specific shifter as disclosed in U.S. Pat. No. 4,469,479 to Ozaki. Further, the tensioner frame for rotatably supporting the tension pulley and the guide pulley may be varied in many ways, because the basic idea of the invention is readily applicable to every rear derailleur that has a tension pulley and a support arm therefor.

I claim:

1. A bicycle rear derailleur for shifting an endless drive chain from one sprocket to another sprocket of a multiple freewheel having a plurality of different sized sprockets and mounted on a rear wheel hub of a bicycle, comprising:
    a guide pulley;
    a tension pulley;
    a tensioner frame means for rotatably supporting said guide pulley and said tension pulley;
    a shifter means for shifting said tensioner frame means in directions substantially parallel with respect to an axis of said rear wheel hub;
    said tensioner frame means including a tension pulley support arm which is resiliently urged to be pivotally moved rearwardly of said bicycle;

said tension pulley being rotatably supported at a free end of said tension pulley support arm;

a compensating means for compensating a sagging in said endless drive chain; and said compensating means being arranged so as to stretch out said endless drive chain rearwardly of said bicycle so that a distance between a geometrical vertical line passing through a center of said tension pulley and a vertical tangential line at a rearmost point of a rearwardly stretched portion of said endless drive chain on said compensating means is larger than a radius of said guide pulley when said tension pulley support arm takes its rearmost position.

2. The bicycle rear derailleur as defined in claim 1, wherein said compensating means includes at least one auxiliary tension pulley rotatably supported by a branch arm which extends from said tension pulley support arm.

3. The bicycle rear derailleur as defined in claim 2, wherein said auxiliary tension pulley and said tension pulley are merged into an enlarged tension pulley rotatably supported by said tension pulley support arm, and said enlarged tension pulley is larger in radius than said guide pulley.

4. A bicycle rear derailleur for shifting an endless drive chain from one sprocket to another sprocket of a multiple freewheel having a plurality of different sized sprockets and mounted on a rear wheel hub of a bicycle, comprising:

a guide pulley;

a tension pulley;

a tensioner frame means for rotatably supporting said guide pulley and said tension pulley;

a shifter means for shifting said tensioner frame means in directions substantially parallel with respect to an axis of said rear wheel hub;

said tensioner frame means including a tension pulley support arm which is resiliently urged to pivotally move rearwardly of said bicycle;

said tension pulley being rotatably supported at a free end of said tension pulley support arm; and an auxiliary tension pulley for compensating for sagging in said endless drive chain;

said auxiliary tension pulley being mounted on a branch arm affixed to said tension pulley support arm for stretching out said endless drive chain rearwardly of said bicycle so that a distance between a geometrical vertical line passing through a center of said tension pulley and a vertical tangential line at a rearmost point of a rearwardly stretched portion of said endless drive chain on said auxiliary tension pulley is larger than a radius of said guide pulley when said tension pulley support arm takes its rearmost position.

* * * * *